United States Patent
Sharma et al.

(10) Patent No.: US 11,228,621 B2
(45) Date of Patent: Jan. 18, 2022

(54) SERVICES-BASED ARCHITECTURE FOR IMS

(71) Applicant: MAVENIR NETWORKS, INC., Richardson, TX (US)

(72) Inventors: Anish Sharma, McKinney, TX (US); Bejoy Pankajakshan, Allen, TX (US); Sushanth Hegde, Bangalore (IN)

(73) Assignee: Mavenir Networks, Inc., Richardson, TX (US)

( * ) Notice: Subject to any disclaimer, the term of this patent is extended or adjusted under 35 U.S.C. 154(b) by 0 days.

(21) Appl. No.: 17/064,258

(22) Filed: Oct. 6, 2020

(65) Prior Publication Data

US 2021/0058435 A1    Feb. 25, 2021

Related U.S. Application Data (63) Continuation of application No. PCT/US2019/027473, filed on Apr. 15, 2019.
(Continued)

(51) Int. Cl.
*H04L 29/06* (2006.01)

(52) U.S. Cl.
CPC ...... *H04L 65/1016* (2013.01); *H04L 65/1006* (2013.01); *H04L 65/1069* (2013.01); *H04L 65/1073* (2013.01)

(58) Field of Classification Search
CPC .......... H04L 65/1016; H04L 65/1006; H04L 65/1069; H04L 65/1073; H04L 61/30;
(Continued)

(56) References Cited

U.S. PATENT DOCUMENTS

2014/0086177 A1* 3/2014 Adjakple ............... H04L 67/10
                                                                       370/329
2016/0353331 A1* 12/2016 Sharma ............... H04L 65/1006
(Continued)

FOREIGN PATENT DOCUMENTS

WO       2018067780 A1    4/2018
WO   WO-2018067780 A1 *  4/2018    ......... H04L 41/0806

OTHER PUBLICATIONS

International Search Report and Written Opinion for corresponding International (PCT) application No. PCT/US19/27473, 17 pages, dated Jul. 5, 2019.

*Primary Examiner* — Glenford J Madamba
(74) *Attorney, Agent, or Firm* — Ohlandt, Greeley, Ruggiero & Perle, LLP (57) ABSTRACT

In a system and a method for providing communication within IP Multimedia Subsystem (IMS) using a connectionless communication protocol, an IMS access layer, an IMS service layer, a common service utilities layer, a unified data repository layer, and an IMS network repository function (NRF) are provided. The IMS access layer terminates incoming communication that uses connection-oriented communication protocol. The IMS service layer is operatively connected to the IMS access layer and includes at least one micro-service implementing IMS service. The common service utilities layer is operatively connected to the IMS service layer and includes at least one utility accessible to the at least one micro-service. The unified data repository layer is operatively connected to, and accessible by, the common service utilities layer, the IMS service layer and the IMS access layer. The IMS NRF enables a network function (NF) or the micro-service to discover another NF or micro-service.

20 Claims, 6 Drawing Sheets

Related U.S. Application Data (60) Provisional application No. 62/659,540, filed on Apr. 18, 2018.

(58) Field of Classification Search
CPC .. H04W 36/0022; H04W 74/04; H04W 38/04
USPC ....................................................... 370/372
See application file for complete search history.

(56) References Cited

U.S. PATENT DOCUMENTS

| | | | |
|---|---|---|---|
| 2017/0257886 A1* | 9/2017 | Adjakple | ................. H04L 67/10 |
| 2018/0035335 A1* | 2/2018 | Wallis | .................... H04W 8/06 |

* cited by examiner

SERVICES-BASED ARCHITECTURE FOR IMS

CROSS REFERENCE TO RELATED APPLICATIONS

The present application is a continuation application of International (PCT) application No. PCT/US2019/027473 filed on Apr. 15, 2019 which claims priority to U.S. Provisional Patent Application No. 62/659,540, filed on Apr. 18, 2018, both of which are incorporated herein by reference in their entireties.

BACKGROUND OF THE DISCLOSURE

Field of the Disclosure

The present disclosure relates to a system and a method for providing a services-based architecture (SBA) for IP Multimedia Subsystem (IMS).

Description of the Related Art

The legacy IP Multimedia Subsystem (IMS) architecture, which was initially defined in Third Generation Partnership Project (3GPP) Release 5, and refined subsequently in Releases 6 and 7, is based on subscriber-related stateful application, e.g., implemented via Serving Call Session Control Function (S-CSCF), and with localization, e.g., implemented via Interrogating Call Session Control Function (I-CSCF). The legacy IMS architecture has some drawbacks, which include i) lack of flexibility for developing advanced services, and ii) lack of suitability for automation and cloud deployment. As one example, all routing in the IMS architecture is based on the subscriber-specific initial Filter Criteria (iFC)-based service chaining. An initial filter criteria (iFC) is an XML-based format used for describing control logic. iFCs represent a provisioned subscription of a user to an application, which iFCs are stored in the Home Subscriber Server (HSS) as part of the IMS Subscription Profile and are downloaded to the S-CSCF. The iFC-based service chaining mechanism adds to signalling overhead due to multiple hops that are required when multiple services need to be involved for the same session, and management of the iFC itself is complex. The High Availability concept using restoration procedures is also inflexible. The stateful nature of applications and the use of connection-oriented protocols such as Session Initiation Protocol (SIP) and Diameter (which is an authentication, authorization, and accounting protocol for computer networks, as defined in RFC 6733 and RFC 7075) present an impediment to transitioning towards web-scale architecture.

3GPP 5G system architecture is services-based, which means the architecture elements are defined as network functions that offer their services via interfaces of a common framework to any other network functions that are permitted to make use of these provided services. Network repository functions (NRF) allow every network function to discover the services offered by other network functions. This architecture model, referred to as services-based architecture, adopts principles such as modularity, reusability and self-containment of network functions. The SBA is currently limited to 5G Core Network.

Therefore, there is a need to transition the legacy IMS core and services to a services-based architecture.

BRIEF SUMMARY OF THE DISCLOSURE

This disclosure provides a system and a method to allow transition of legacy IMS-based architecture to a services-based architecture using web-scale approach, enabling deployments to take advantage of the latest virtualization and software technologies, and to achieve end-to-end network transformation.

In one example embodiment, a system and a method to support connectionless protocols for communication within the IMS by implementing services-based architecture are provided.

In one example embodiment, a system and a method to support service-centric service brokering are provided.

In one example embodiment, a method of providing communication within IP Multimedia Subsystem (IMS) using a connectionless communication protocol is provided, which method includes: providing an IMS access layer configured to receive incoming communication request in at least one connection-oriented communication protocol; providing an IMS service layer operatively connected to the IMS access layer, wherein the IMS service layer comprises at least one micro-service implementing IMS service, and wherein the at least one micro-service utilizes at least one of service-based interface and open Application Programming Interface (API) for communication with another micro-service; providing a common service utilities layer operatively connected to the IMS service layer, wherein the common service utilities layer comprises at least one utility accessible to the at least one micro-service; providing a unified data repository layer operatively connected to, and accessible by, the common service utilities layer, the IMS service layer and the common IMS access layer; and providing an IMS network repository function (NRF) operatively connected to, and accessible by, at least one of the common service utilities layer, the IMS service layer and the IMS access layer, wherein the IMS NRF enables at least one of a network function (NF) and the at least one micro-service to at least one of i) discover another NF or micro-service, and ii) communicate with another NF or micro-service.

In another example embodiment, a method of providing communication within IP Multimedia Subsystem (IMS) using a connectionless communication protocol is provided, in which method the at least one connection-oriented communication protocol includes at least one of Session Initiation Protocol (SIP), General Packet Radio Service Tunnel Protocol (GTP) and Diameter.

In another example embodiment, a method of providing communication within IP Multimedia Subsystem (IMS) using a connectionless communication protocol is provided, which method includes: providing an IMS access layer configured to receive incoming communication request in at least one connection-oriented communication protocol; and providing an IMS service layer operatively connected to the IMS access layer, wherein the IMS service layer comprises at least one micro-service implementing IMS service, and wherein the at least one micro-service utilizes at least one of service-based interface and open Application Programming Interface (API) for communication with another micro-service, and wherein the at least one micro-service includes at least one of registration service, voice service, video service and messaging service.

In another example embodiment, a method of providing communication within IP Multimedia Subsystem (IMS) using a connectionless communication protocol is provided, which method includes: providing an IMS access layer configured to receive incoming communication request in at least one connection-oriented communication protocol; providing an IMS service layer operatively connected to the IMS access layer, wherein the IMS service layer comprises at least one micro-service implementing IMS service, and wherein the at least one micro-service utilizes at least one of service-based interface and open Application Programming Interface (API) for communication with another micro-service; and providing a common service utilities layer operatively connected to the IMS service layer, wherein the common service utilities layer comprises at least one utility accessible to the at least one micro-service, and wherein the at least one utility includes at least one of charging function and subscriber data management function.

In another example embodiment, a method of providing communication within IP Multimedia Subsystem (IMS) using a connectionless communication protocol is provided, which method includes: providing an IMS access layer configured to receive incoming communication request in at least one connection-oriented communication protocol; providing an IMS service layer operatively connected to the IMS access layer, wherein the IMS service layer comprises at least one micro-service implementing IMS service, and wherein the at least one micro-service utilizes at least one of service-based interface and open Application Programming Interface (API) for communication with another micro-service; providing a common service utilities layer operatively connected to the IMS service layer, wherein the common service utilities layer comprises at least one utility accessible to the at least one micro-service; and providing a unified data repository layer operatively connected to, and accessible by, the common service utilities layer, the IMS service layer and the IMS access layer, wherein the unified data repository layer comprises a repository for at least one of active user equipment (UE) context data, dynamic session context data, application-specific data, subscription data, policy data, and network data.

In another example embodiment, a method of providing communication within IP Multimedia Subsystem (IMS) using a connectionless communication protocol is provided, which method includes: providing an IMS access layer configured to receive incoming communication request in at least one connection-oriented communication protocol; and providing an IMS service layer operatively connected to the IMS access layer, wherein the IMS service layer comprises at least one micro-service implementing IMS service, and wherein the IMS access layer implements service brokering rules to select a provider service (which can be a micro-service) corresponding to the incoming communication request.

In another example embodiment, a method of providing communication within IP Multimedia Subsystem (IMS) using a connectionless communication protocol is provided, which method includes: providing an IMS access layer configured to receive incoming communication request in at least one connection-oriented communication protocol; and providing an IMS service layer operatively connected to the IMS access layer, wherein the IMS service layer comprises at least one micro-service implementing IMS service, and wherein the IMS access layer implements service brokering rules to select a provider service corresponding to the incoming communication request, and wherein the IMS access layer comprises a Proxy Call Session Control Function (P-CSCF) configured to apply the service brokering rules.

In another example embodiment, a method of providing communication within IP Multimedia Subsystem (IMS) using a connectionless communication protocol is provided, which method includes: providing an IMS access layer configured to receive incoming communication request in at least one connection-oriented communication protocol; and providing an IMS service layer operatively connected to the IMS access layer, wherein the IMS service layer comprises at least one micro-service implementing IMS service, and wherein the IMS access layer implements service brokering rules to select a provider service corresponding to the incoming communication request, and wherein the IMS access layer comprises a Proxy Call Session Control Function (P-CSCF) configured to apply the service brokering rules, wherein the P-CSCF transforms a Session Initiation Protocol (SIP) register request received from an IMS SIP client to a register request Representational State Transfer Application Programming Interface (REST API) and routes the register request REST API to the selected provider service.

In another example embodiment, a method of providing communication within IP Multimedia Subsystem (IMS) using a connectionless communication protocol is provided, which method includes: providing an IMS access layer configured to receive incoming communication request in at least one connection-oriented communication protocol; and providing an IMS service layer operatively connected to the IMS access layer, wherein the IMS service layer comprises at least one micro-service implementing IMS service, and wherein the IMS access layer implements service brokering rules to select a provider service corresponding to the incoming communication request, and wherein the IMS access layer comprises a Proxy Call Session Control Function (P-CSCF) configured to apply the service brokering rules, and wherein the P-CSCF transforms a Session Initiation Protocol (SIP) invite request received from an IMS SIP client to an audio-visual (AV) session setup request Representational State Transfer Application Programming Interface (REST API) and routes the AV session setup request REST API to the selected provider service.

In another example embodiment, a method of providing communication within IP Multimedia Subsystem (IMS) using a connectionless communication protocol is provided, which method includes: providing an IMS access layer configured to receive incoming communication request in at least one connection-oriented communication protocol; and providing an IMS service layer operatively connected to the IMS access layer, wherein the IMS service layer comprises at least one micro-service implementing IMS service, and wherein the IMS access layer implements service brokering rules to select a provider service corresponding to the incoming communication request, and wherein the IMS access layer comprises a Proxy Call Session Control Function (P-CSCF) configured to apply the service brokering rules, and wherein the P-CSCF transforms a Session Initiation Protocol (SIP) invite request received from an IMS SIP client for a Rich Communication Service (RCS) chat session to an RCS chat session setup request Representational State Transfer Application Programming Interface (REST API) and routes the RCS chat session setup request REST API to the selected provider service.

In one example embodiment, a system for providing communication within IP Multimedia Subsystem (IMS) using a connectionless communication protocol is provided, which system includes: an IMS access layer configured to receive incoming communication request in at least one connection-oriented communication protocol; an IMS service layer operatively connected to the IMS access layer, wherein the IMS service layer comprises at least one micro-service implementing IMS service, and wherein the at least one micro-service utilizes at least one of service-based interface and open Application Programming Interface (API) for communication with another micro-service; a common service utilities layer operatively connected to the IMS service layer, wherein the common service utilities layer comprises at least one utility accessible to the at least one micro-service; a unified data repository layer operatively connected to, and accessible by, the common service utilities layer, the IMS service layer and the IMS access layer; and an IMS network repository function (NRF) operatively connected to, and accessible by, at least one of the common service utilities layer, the IMS service layer and the IMS access layer, wherein the IMS NRF enables at least one of a network function (NF) and the at least one micro-service to at least one of i) discover another NF or micro-service, and ii) communicate with another NF or micro-service.

In another example embodiment, a system for providing communication within IP Multimedia Subsystem (IMS) using a connectionless communication protocol is provided, in which system the at least one connection-oriented communication protocol includes at least one of Session Initiation Protocol (SIP), General Packet Radio Service Tunnel Protocol (GTP) and
Diameter.

In another example embodiment, a system for providing communication within IP Multimedia Subsystem (IMS) using a connectionless communication protocol is provided, which system includes: an IMS access layer configured to receive incoming communication request in at least one connection-oriented communication protocol; and an IMS service layer operatively connected to the IMS access layer, wherein the IMS service layer comprises at least one micro-service implementing IMS service, and wherein the at least one micro-service utilizes at least one of service-based interface and open Application Programming Interface (API) for communication with another micro-service, and wherein the at least one micro-service includes at least one of registration service, voice service, video service and messaging service.

In another example embodiment, a system for providing communication within IP Multimedia Subsystem (IMS) using a connectionless communication protocol is provided, which system includes: an IMS access layer configured to receive incoming communication request in at least one connection-oriented communication protocol; an IMS service layer operatively connected to the IMS access layer, wherein the IMS service layer comprises at least one micro-service implementing IMS service, and wherein the at least one micro-service utilizes at least one of service-based interface and open Application Programming Interface (API) for communication with another micro-service; and a common service utilities layer operatively connected to the IMS service layer, wherein the common service utilities layer comprises at least one utility accessible to the at least one micro-service, and wherein the at least one utility includes at least one of charging function and subscriber data management function.

In another example embodiment, a system for providing communication within IP Multimedia Subsystem (IMS) using a connectionless communication protocol is provided, which system includes: an IMS access layer configured to receive incoming communication request in at least one connection-oriented communication protocol; an IMS service layer operatively connected to the IMS access layer, wherein the IMS service layer comprises at least one micro-service implementing IMS service, and wherein the at least one micro-service utilizes at least one of service-based interface and open Application Programming Interface (API) for communication with another micro-service; a common service utilities layer operatively connected to the IMS service layer, wherein the common service utilities layer comprises at least one utility accessible to the at least one micro-service; and a unified data repository layer operatively connected to, and accessible by, the common service utilities layer, the IMS service layer and the IMS access layer, wherein the unified data repository layer comprises a repository for at least one of active user equipment (UE) context data, dynamic session context data, application-specific data, subscription data, policy data, and network data.

In another example embodiment, a system for providing communication within IP Multimedia Subsystem (IMS) using a connectionless communication protocol is provided, which system includes: an IMS access layer configured to receive incoming communication request in at least one connection-oriented communication protocol; and an IMS service layer operatively connected to the IMS access layer, wherein the IMS service layer comprises at least one micro-service implementing IMS service, and wherein the IMS access layer implements service brokering rules to select a provider service corresponding to the incoming communication request.

In another example embodiment, a system for providing communication within IP Multimedia Subsystem (IMS) using a connectionless communication protocol is provided, which system includes: an IMS access layer configured to receive incoming communication request in at least one connection-oriented communication protocol; and an IMS service layer operatively connected to the IMS access layer, wherein the IMS service layer comprises at least one micro-service implementing IMS service, and wherein the IMS access layer implements service brokering rules to select a provider service corresponding to the incoming communication request, and wherein the IMS access layer comprises a Proxy Call Session Control Function (P-CSCF) configured to apply the service brokering rules.

In another example embodiment, a system for providing communication within IP Multimedia Subsystem (IMS) using a connectionless communication protocol is provided, which system includes: an IMS access layer configured to receive incoming communication request in at least one connection-oriented communication protocol; and an IMS service layer operatively connected to the IMS access layer, wherein the IMS service layer comprises at least one micro-service implementing IMS service, and wherein the IMS access layer implements service brokering rules to select a provider service corresponding to the incoming communication request, and wherein the IMS access layer comprises a Proxy Call Session Control Function (P-CSCF) configured to apply the service brokering rules, wherein the P-CSCF transforms a Session Initiation Protocol (SIP) register request received from an IMS SIP client to a register request Representational State Transfer Application Programming Interface (REST API) and routes the register request REST API to the selected provider service.

In another example embodiment, a system for providing communication within IP Multimedia Subsystem (IMS) using a connectionless communication protocol is provided, which system includes: an IMS access layer configured to receive incoming communication request in at least one connection-oriented communication protocol; and an IMS service layer operatively connected to the IMS access layer, wherein the IMS service layer comprises at least one micro-service implementing IMS service, and wherein the IMS access layer implements service brokering rules to select a provider service corresponding to the incoming communication request, and wherein the IMS access layer comprises a Proxy Call Session Control Function (P-CSCF) configured to apply the service brokering rules, and wherein the P-CSCF transforms a Session Initiation Protocol (SIP) invite request received from an IMS SIP client to an audio-visual (AV) session setup request Representational State Transfer Application Programming Interface (REST API) and routes the AV session setup request REST API to the selected provider service.

In another example embodiment, a system of providing communication within IP Multimedia Subsystem (IMS) using a connectionless communication protocol is provided, which system includes: an IMS access layer configured to receive incoming communication request in at least one connection-oriented communication protocol; providing an IMS service layer operatively connected to the IMS access layer, wherein the IMS service layer comprises at least one micro-service implementing IMS service, and wherein the IMS access layer implements service brokering rules to select a provider service corresponding to the incoming communication request, and wherein the IMS access layer comprises a Proxy Call Session Control Function (P-CSCF) configured to apply the service brokering rules, and wherein the P-CSCF transforms a Session Initiation Protocol (SIP) invite request received from an IMS SIP client for a Rich Communication Service (RCS) chat session to an RCS chat session setup request Representational State Transfer Application Programming Interface (REST API) and routes the RCS chat session setup request REST API to the selected provider service.

DETAILED DESCRIPTION OF DISCLOSURE

Figure 1:
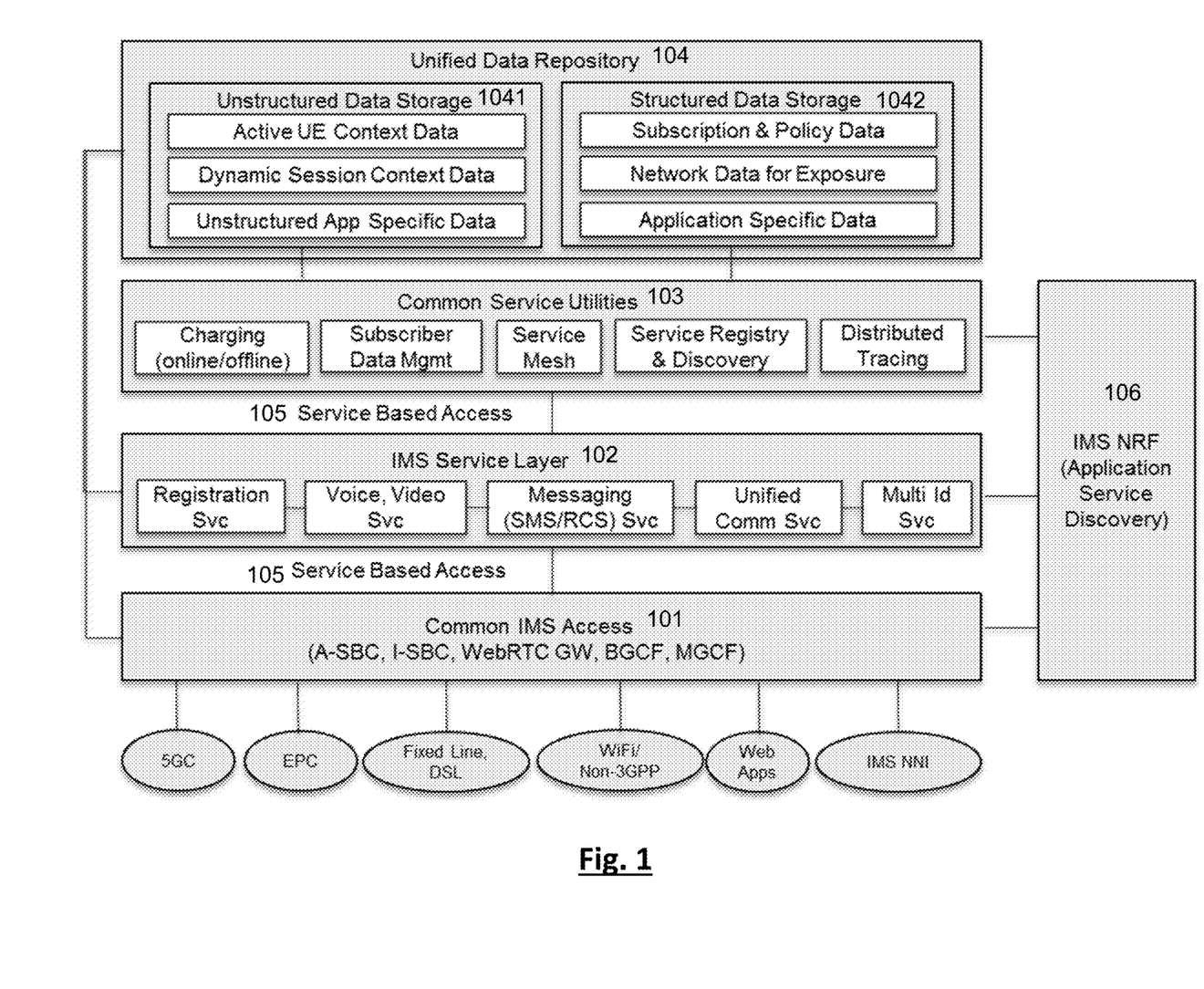
FIG. 1 shows an overall system architecture of an example embodiment of the system according to the present disclosure.

The current IMS architecture is a reference-point-based architecture with point-to-point interfaces implemented using connection-oriented interface protocols. In order to support services-based architecture (SBA) in the IMS, the present disclosure provides that i) various functions are broken up into micro-services, and ii) all communications among these micro-services are based on services-based interfaces and open application programming interfaces (APIs). FIG. 1 shows an overall system architecture of an example embodiment of the system according to the present disclosure. The example embodiment shown in FIG. 1 is a tiered architecture including: an IMS access layer or tier 101 (also referred to as common IMS access layer or tier); IMS service layer or tier 102; common service utilities layer or tier 103; and unified data repository layer or tier 104. In addition, IMS NRF (application service discovery) module 106 is also provided in the architecture. Components of each layer described in this disclosure can be implemented as software (e.g., stored on a computer-readable medium), hardware (e.g., using application specific integrated circuits (ASICs)), or a combination of software and hardware.

The first tier, common IMS access tier 101, is the entry point into the IMS, acting as the common IMS access. The common IMS access tier 101 acts as the protocol abstraction layer, and terminates all connection-oriented protocols such as General Packet Radio Service Tunnel Protocol (GTP), SIP, etc. The common IMS access tier 101 interfaces with the IMS core using service based access 105, e.g., via service based interface (SBI). The common IMS access tier 101 will perform the required interworking with any external entities, some examples of which are shown in FIG. 1, e.g., 5G Core (5GC), Evolved Packet Core (EPC), fixed line, digital subscriber line (DSL), WiFi, non-3GPP, Web apps, and IMS Network Interconnects (NNI). As shown in FIG. 1, the following can be included in the common IMS access tier 101: access session border controller (A-SBC); interconnect session border controller (I-SBC); Web Real-Time Communication gateway (WRG); breakout gateway control function (BGCF); and media gateway controller function (MGCF). These are merely examples and are not to be construed as limiting.

The next, higher tier is the IMS service layer 102, which eliminates the need for the legacy IMS core, and the common IMS access layer 101 directly communicates with the IMS service layer 102 without the assistance of stateful S-CSCF or localisation function of I-CSCF. The common IMS access layer 101 is configured to support intelligent service brokering function, which is not as complex as subscriber-based service chaining in the legacy IMS. The IMS service layer 102 is a collection of micro-services implementing services such as registration service, voice & video service, messaging services (e.g., short messaging service (SMS), Rich Communication Services (RCS)), unified communication service, and multi-ID services. These services can be chained using predefined rules taking static or dynamic inputs to create the required enhanced services. These service brokering rules are made available to each micro-service as part of application configuration.

All the services in the IMS service layer 102 can access and make use of common utilities to execute their service logic, which common utilities collectively form the next tier or layer, common service utilities tier or layer 103. These utilities can include, e.g., charging functions which support online and offline charging; subscriber data management functions which interface with the backend subscriber or non-subscriber databases to retrieve the required profiles; and any legacy interworking functions (some examples of which are depicted in FIG. 1 as "Service Mesh," "Service Registry & Discovery," and "Distributed Tracing") required to access legacy intelligent network (IN) services. The benefit of organizing these utilities into a common service utilities tier or layer 103 is that these utilities functions no longer need to be duplicated at every service. Once decomposed into independently deployable functions, the utilities can be independently managed and accessed by any service.

Also shown in FIG. 1 is IMS network repository functions (NRF) module 106, which allows network functions to discover the services offered by other network functions (hence labelled "IMS NRF (application service discovery)" in FIG. 1). As shown in FIG. 1, the IMS NRF module 106 is operatively coupled to, and can be accessed by, e.g., common services utilities layer 103, IMS service layer 102, and common IMS access layer 101.

In addition to the above, unified data repository tier or layer 104 is provided in the tiered architecture, which unified data repository tier or layer 104 serves as the repository for subscriber data, policy data or any dynamic session data. All the tiers in the architecture have access to the unified data repository tier or layer 104, which is a component required to support stateless functions. All dynamic session state information will be stored in the unstructured data storage module or function 1041 of unified data repository tier 104, which can be retrieved by any of the network functions in any of the tiers. As shown in FIG. 1, unstructured data storage module or function 1041 can store, e.g., active user equipment (UE) context data, dynamic session context data, and unstructured application-specific data. Also included in the unified data repository tier or layer 104 is structured data storage module or function 1042, which can store, e.g., subscription and policy data, network data for exposure, and application-specific data. All communication between different network functions use connectionless protocol, and no specialized protocol such as Diameter or SIP is used. The connectionless protocol can be based on Representational State Transfer (REST)-based API framework using HTTP/2 over Transmission Control Protocol (TCP), User Datagram Protocol (UDP), and/or Quick UDP Internet Connections (QUIC) protocol as transport and JavaScript Object Notation (JSON) for serialization.

Figure 2:
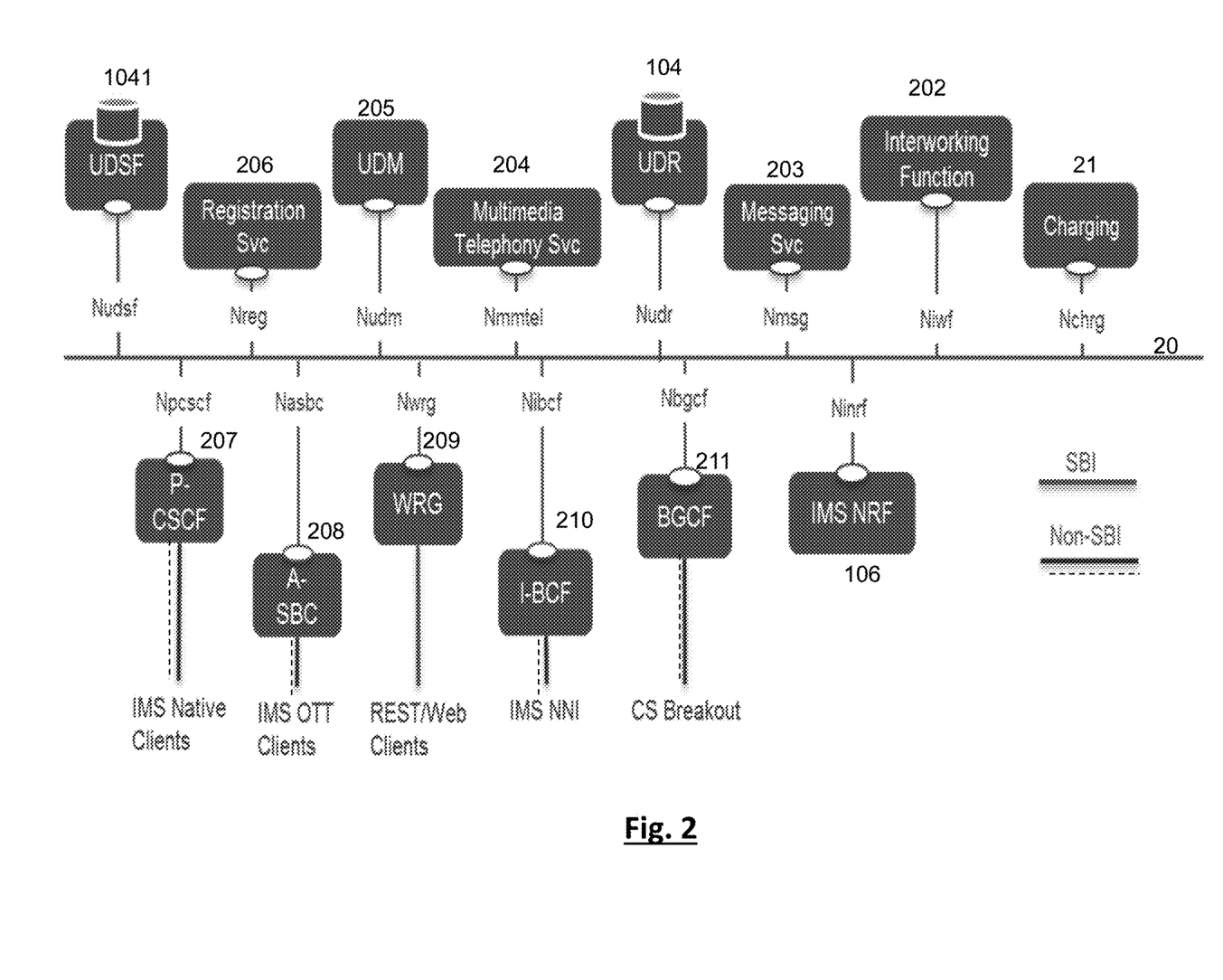
FIG. 2 shows a simplified block diagram illustrating the communication connection among various example network functions

FIG. 2 shows a simplified block diagram illustrating the communication connection among various example network functions, via micro-service bus 20. A component of the micro-service bus architecture is the IMS NRF 106 which acts as a repository function to enable all network functions (NFs) or micro-services to discover other NFs or micro-services and enable communication between different NFs and/or micro-services. There is no predefined interface between the NFs, any authorized NF can query another NF. This is one of the major advantage of the SBA, where a new service can be created dynamically without having to pre-define the interfaces. Some of the example connections shown in FIG. 2 include: charging function 21 (connected to bus 20 via Nchrg); interworking function 202 (connected to bus 20 via Niwf); messaging service 203 (connected to bus 20 via Nmsg); Unified Data Repository (UDR) 104 (connected to bus 20 via Nudr); multimedia telephony service 204 (connected to bus 20 via Nmmtel); unified data management function (UDM) 205 (connected to bus 20 via Nudm); registration service 206 (connected to bus 20 via Nreg); Unstructured Data Storage Function 1041 (connected to bus 20 via Nudsf); Proxy-Call Session Control Function (P-CSCF) 207 (connected to bus 20 via Npcscf); access session border controller (A-SBC) 208 (connected to bus 20 via Nasbc); Web Real-Time Communication gateway (WRG) 209 (connected to bus 20 via Nwrg); Interconnection Border Control Function (I-BCF) 210 (connected to bus 20 via Nibcf); and breakout gateway control function (BGCF) 211 (connected to bus 20 via Nbgcf). In FIG. 2, southbound interface (SBI) connections are shown by a single solid line, and non-southbound interface connections (non-SBI) are shown by a combination of a solid and dashed lines. Non-SBI connections shown in FIG. 2 include: connection between P-CSCF 207 to IMS native clients; connection between A-SBC 208 and IMS over-the-top (OTT) clients; connection between I-BCF 210 and IMS network interconnect (NNI); and connection between BGCF 211 and circuit switched (CS) breakout, i.e., routing a call originated by a user in a packet switched network (e.g., 4G IMS network) to a user in a legacy circuit switched (CS) network (e.g., public switched telephone network (PSTN)).

At the common IMS access layer 101 shown in FIG. 1, a streamlined way to select and consume services from a provider is provided. According to the present disclosure, a service broker functionality is provided by the common IMS access layer 101, which broker functionality holds the information about the services provided in the form of service catalog, and service brokering policies or rules are applied to select appropriate provider service for a specific request. In one example embodiment according to the present disclosure, the service broker functionality is provided by a P-CSCF, but other elements can provide the service broker functionality. These service brokering policies, which determine the internal routing within the IMS, are based on static rules composed using information received in the incoming request and subscriber-specific information retrieved from the subscriber data repository. The outgoing request may also include additional information, which will assist the recipient network function (NF) for subsequent routing of the request.

Figure 3:
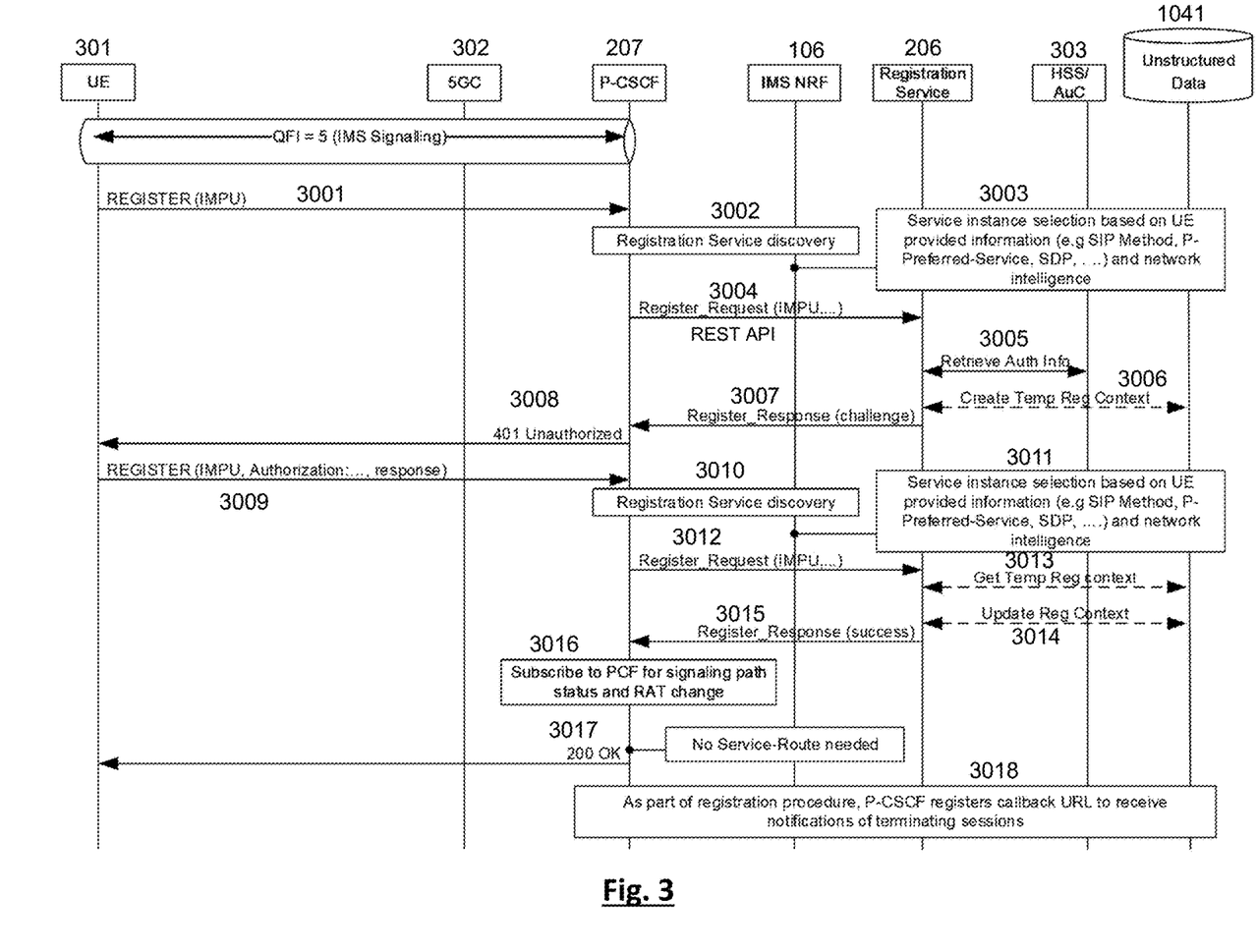
FIG. 3 illustrates an example embodiment of the message flow of a registration sequence for an IMS SIP client.

FIG. 3 illustrates an example embodiment of the message flow of a registration sequence for an IMS SIP client. At 3001, the IMS SIP client (on UE 301) attempts to register by sending a SIP REGISTER request message to the P-CSCF 207 via 5GC 302. At 3002, the P-CSCF 207 discovers the available instance of the provider service by invoking the service discovery procedure which involves looking up the IMS NRF 106. At 3003, the P-CSCF 207 performs service instance selection, which can be based on UE-provided information (e.g., SIP method, P-preferred service, and software-defined protocol (SDP)), as well as network intelligence. At 3004, the P-CSCF transforms the SIP REGISTER request to a Register Request REST API and routes the request to the selected provider service instance, which in the example of FIG. 3 is registration service 206. At 3005, the registration service 206 performs the authentication procedure by retrieving the authentication information for the user from the UDR (which in this example is provided by HSS/AuC 303) via the UDM 205. At 3006, a temporary registration context is created (and stored at unstructured data storage 1041), prior to challenging the user. At 3007, the registration service 206 challenges the user (by sending register response message with a challenge) in response to the register request. At 3008, upon receipt of the register response message with a challenge, the P-CSCF 207 sends a "401 unauthorized" message to the IMS SIP client (on the UE 301).

At 3009, the IMS SIP client (on the UE 301) sends a second SIP REGISTER request to the P-CSCF 207, which second SIP REGISTER request includes the Authorization header containing an authentication challenge response. At 3010, the registration service discovery (corresponding to the one performed at 3002) is repeated, and at 3011, the service instance selection (corresponding to the one performed at 3003) is repeated. At 3012, the P-CSCF 207 sends a Register Request REST API to the registration service 206. At 3013, the registration service retrieves the temporary registration context for this session, and checks whether the received authentication challenge and the expected authentication challenge response match. If the authentication challenges match, which is the case in the example shown, a permanent registration context is created (and stored in at unstructured data storage 1041). If the authentication challenges don't match, the register request is rejected. At 3015, the registration service 206 returns a Register Response success message to the P-CSCF 207. At 3016, the P-CSCF 207 subscribes to policy control function (PCF) for signalling path status and radio access technology (RAT) change.

At 3017, upon receipt of the Register Response success message, the P-CSCF 207 sends a "200 OK" final response to the IMS SIP client (on the UE 301), and no service route is needed. At 3018, as part of the registration process, P-CSCF registers call-back uniform resource locator (URL) to receive notifications of terminating sessions.

Figure 4:
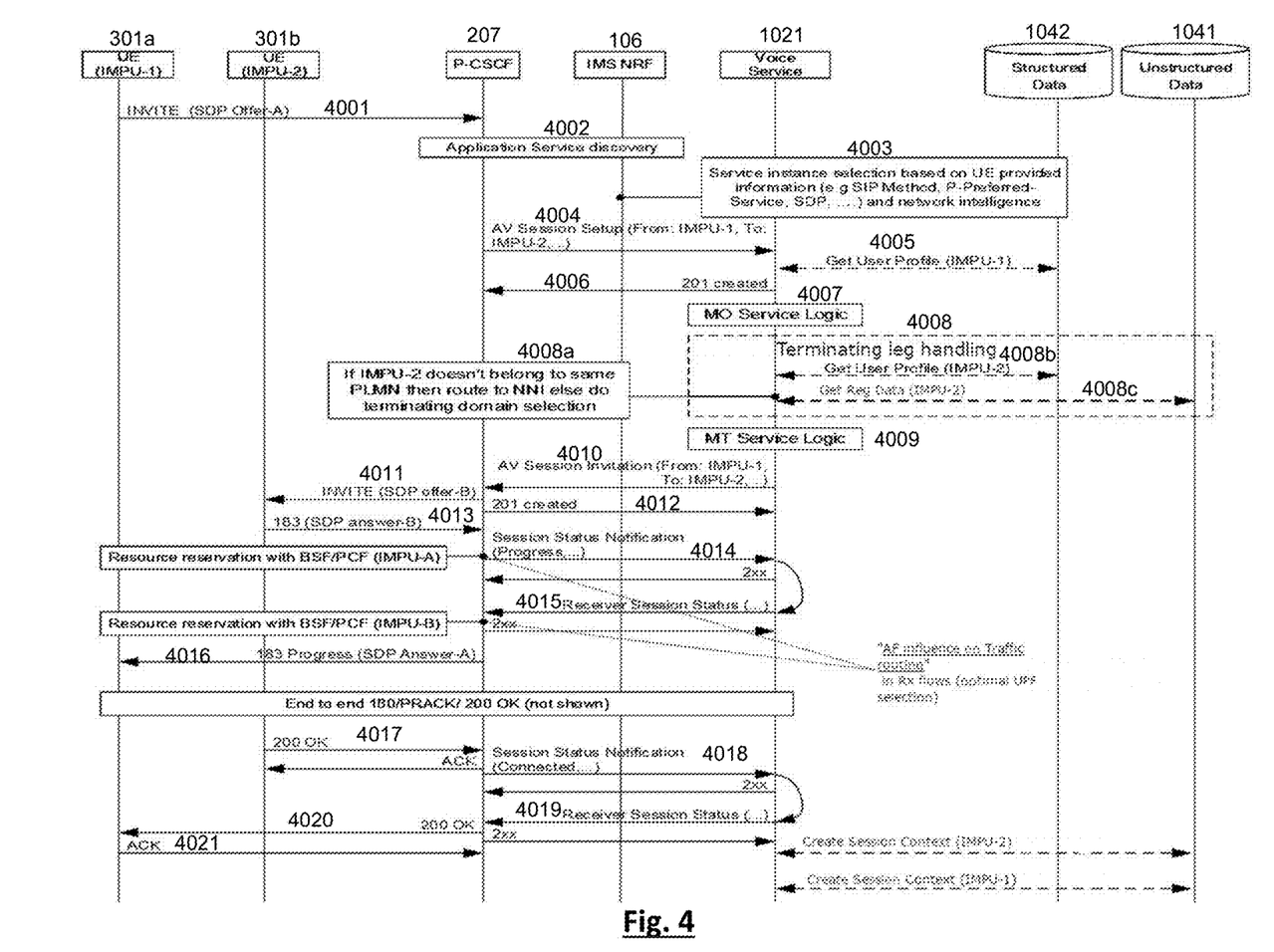
FIG. 4 illustrates an example message flow of a voice session setup sequence for an IMS SIP client.

FIG. 4 illustrates an example message flow of a voice session setup sequence for an IMS SIP client. At 4001, the calling party (or initiating party or user, UE 301a) initiates a call to the called party (UE 301b) by the IMS SIP client (on UE 301a) sending out a SIP INVITE request to the P-CSCF 207. At 4002, the P-CSCF 207 discovers the available instance of the provider service by invoking the service discovery procedure which involves looking up the IMS NRF 106. At 4003, the P-CSCF 207 performs service instance selection, which can be based on UE-provided information (e.g., SIP method, P-preferred service, and software-defined protocol (SDP)), as well as network intelligence. At 4004, the P-CSCF 207 transforms the SIP INVITE request to an AV Session Setup Request REST API and routes the request to the selected provider service instance, which in this case is a voice service 1021. At 4005, the voice service 1021 retrieves the user profile from the structured data storage 1042 of the unified data repository 104, and checks whether the initiating user (UE 301a) is entitled to make an origination request. At 4006, the voice service 1021 creates a voice service object, and returns "201 created" message. At 4007, mobile originating (MO) service procedures are applied by the voice service 1021, e.g., applying all the MO services for the initiating user.

After all the MO services are applied, the terminating call leg handling is invoked at 4008, which involves determining the destination network for the called party (or terminating user) 301b (which has an IP Multimedia Public Identity (IMPU), i.e., IMPU-2 in this example). At 4008a, if IMPU-2 of the called party doesn't belong to the same public land mobile network (PLMN) as IMPU-1 of the calling party (UE 301a), then the call is routed to network-to-network interface (NNI). If IMPU-2 of the called party belongs to the same PLMN as IMPU-1 of the calling party (which is the case in the example shown), terminating domain selection is performed, and the user profile for the called party (UE 301b) is retrieved (at 4008b) from the structured data storage 1042, and the registration data for the called party is retrieved (at 4008c) from the unstructured data storage 1041. At 4009, mobile terminating (MT) services are applied.

Following the applying of the MT services, the voice service 1021 initiates (at 4010) a REST API AV Session Invitation towards the P-CSCF 207. At 4011, the P-CSCF 207 retrieves the context for the terminating user (UE 301b) and sends a SIP INVITE to the terminating user (UE 301b). At 4012, P-CSCF sends "201 created" message to the voice service 1021. At 4013, the IMS SIP client (on UE 301b) returns a 183 provisional response to the P-CSCF 207, which is mapped to Session Status Notification API (with Progress as the status) on the REST interface and sent (at 4014) from P-CSCF 207 to the voice service 1021. At 4015, the voice service 1021 forwards the Session Status Notification API to the P-CSCF 207 for the originating user. At 4016, the P-CSCF 207 of the originating user maps the Session Status Notification API with "Progress" as the status to 183 provisional response and sends the response to the originating party (UE 301a). When the terminating user (UE 301b) answers the call, the IMS SIP client (on UE 301b) will generate (at 4017) a "200 OK" message. At 4018, the P-CSCF 207 of the terminating user will send a Session Status Notification indicating connected status to the voice service 1021. At 4019, the voice service 1021 sends the Session Status Notification to the P-CSCF 207 for the originating user (UE 301a). At 4020, the P-CSCF 207 of the originating user will map the Session Status Notification API with "Connected" as the status to "200 OK" final response and sends the response to the originating party. At 4021, acknowledgment "ACK" is sent from the originating party to the P-CSCF 207. The call is now considered to be two-way connected. In the example shown in FIG. 4, a single P-CSCF 207 is shown as the P-CSCF for both the originating party and the terminating party, but different P-CSCFs can serve the two parties.

Figure 5:
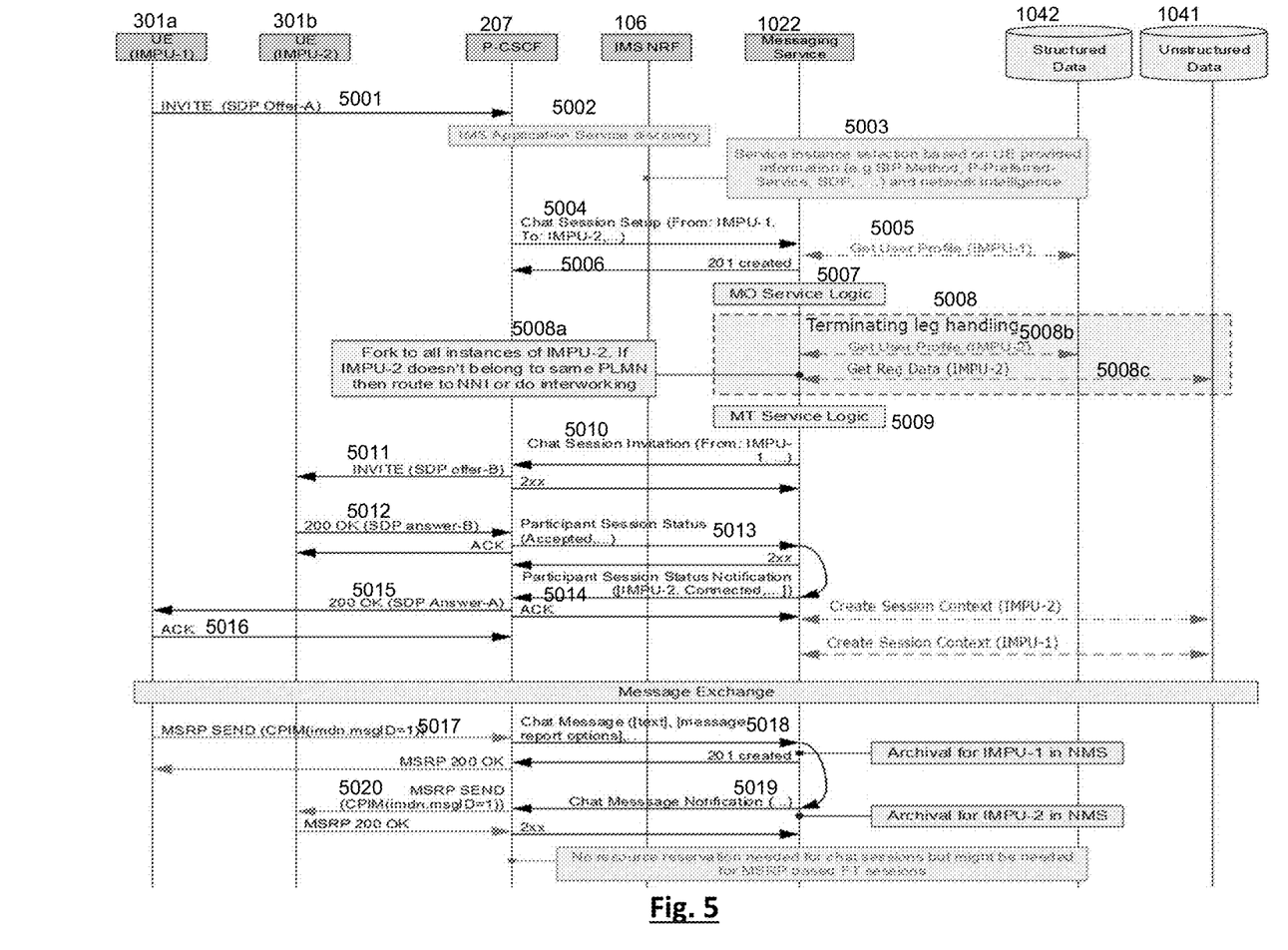
FIG. 5 illustrates an example message flow of a Rich Communication Services (RCS) chat session setup sequence for an IMS SIP client.

FIG. 5 illustrates an example message flow of a Rich Communication Services (RCS) chat session setup sequence for an IMS SIP client. At 5001, the originating party (or initiating party or user, UE 301a) initiates a chat to the called party (UE 301b) by the IMS SIP client (on UE 301a) sending out a SIP INVITE request to the P-CSCF 207. At 5002, the P-CSCF 207 discovers the available instance of the provider service by invoking the service discovery procedure which involves looking up the IMS NRF 106. At 5003, the P-CSCF 207 performs service instance selection, which can be based on UE-provided information (e.g., SIP method, P-preferred service, and software-defined protocol (SDP)), as well as network intelligence. At 5004, the P-CSCF 207 transforms the SIP INVITE request to an RCS Chat Session Setup Request REST API and routes the request to the selected provider service instance, which in this case is a messaging service 1022. At 5005, messaging service 1022 retrieves the originating user profile from the structured data storage 1042 of the unified data repository 104, and checks whether the initiating user (UE 301a) is entitled to make an origination request. At 5006, the messaging service 1022 creates a messaging service object, and returns "201 created" message. At 5007, mobile originating (MO) service procedures are applied by the messaging service 1022, e.g., applying all the MO services for the initiating user.

After all the MO services are applied, the terminating call leg handling is invoked at 5008, which involves determining the destination network for the called party (or terminating user or party) 301b (which has an IP Multimedia Public Identity (IMPU), i.e., IMPU-2 in this example). At 5008a, if IMPU-2 of the called party doesn't belong to the same public land mobile network (PLMN) as IMPU-1 of the originating party (UE 301a), then the call is routed to network-to-network interface (NNI) or interworking is performed. If IMPU-2 of the called party belongs to the same PLMN as IMPU-1 of the originating party (which is the case in the example shown), terminating domain selection is performed, and the user profile for the called party (UE 301b) is retrieved (at 5008b) from the structured data storage 1042, and the registration data for the called party is retrieved (at 5008c) from the unstructured data storage 1041. At 5009, mobile terminating (MT) services are applied.

Following the applying of the MT services, the messaging service 1022 initiates (at 5010) a REST API Chat Session Invitation towards the P-CSCF 207. At 5011, the P-CSCF 207 retrieves the context for the terminating user or party (UE 301b) and sends a SIP INVITE to the terminating user (UE 301b). There may be one or more clients registered for the called user (UE 301b), in which case invitation is sent to all registered instances of the user, but this is not shown in FIG. 5 for the sake of brevity. At 5012, the IMS SIP client (on UE 301b) accepts the session by sending a "200 OK" message, which is mapped to Session Status Notification API on the REST interface and sent (at 5013) from the P-CSCF 207 to the messaging service 1022. At 5014, the messaging service 1022 forwards the Session Status Notification API to the P-CSCF 207 for the originating user. At 5015, the P-CSCF 207 of the originating user maps the Session Status Notification API with participant status to "200 OK" response and sends the response to the originating party (UE 301*a*), thereby establishing the end-to-end chat session. At 5016, acknowledgment "ACK" is sent from the originating party to the P-CSCF 207. In the example shown in FIG. 5, a single P-CSCF 207 is shown as the P-CSCF for both the originating party and the terminating party, but different P-CSCFs can serve the two parties.

As shown in the portion of FIG. 5 labeled "Message Exchange," any messages sent by client using Message Session Relay Protocol (MSRP) transport (e.g., at 5017 in FIG. 5) are interworked to chat message APIs (e.g., at 5018 in FIG. 5) by the P-CSCF 207 and sent to the messaging service 1022. The messaging service 1022 then applies service logic and relays the message (at 5019 in FIG. 5) to the terminating leg, i.e., the P-CSCF 207 of the terminating user. The P-CSCF 207 of the terminating user interwork (e.g., at 5020 in FIG. 5) the chat APIs to MSRP towards the IMS client on the terminating user, UE 301*b*.

Figure 6:
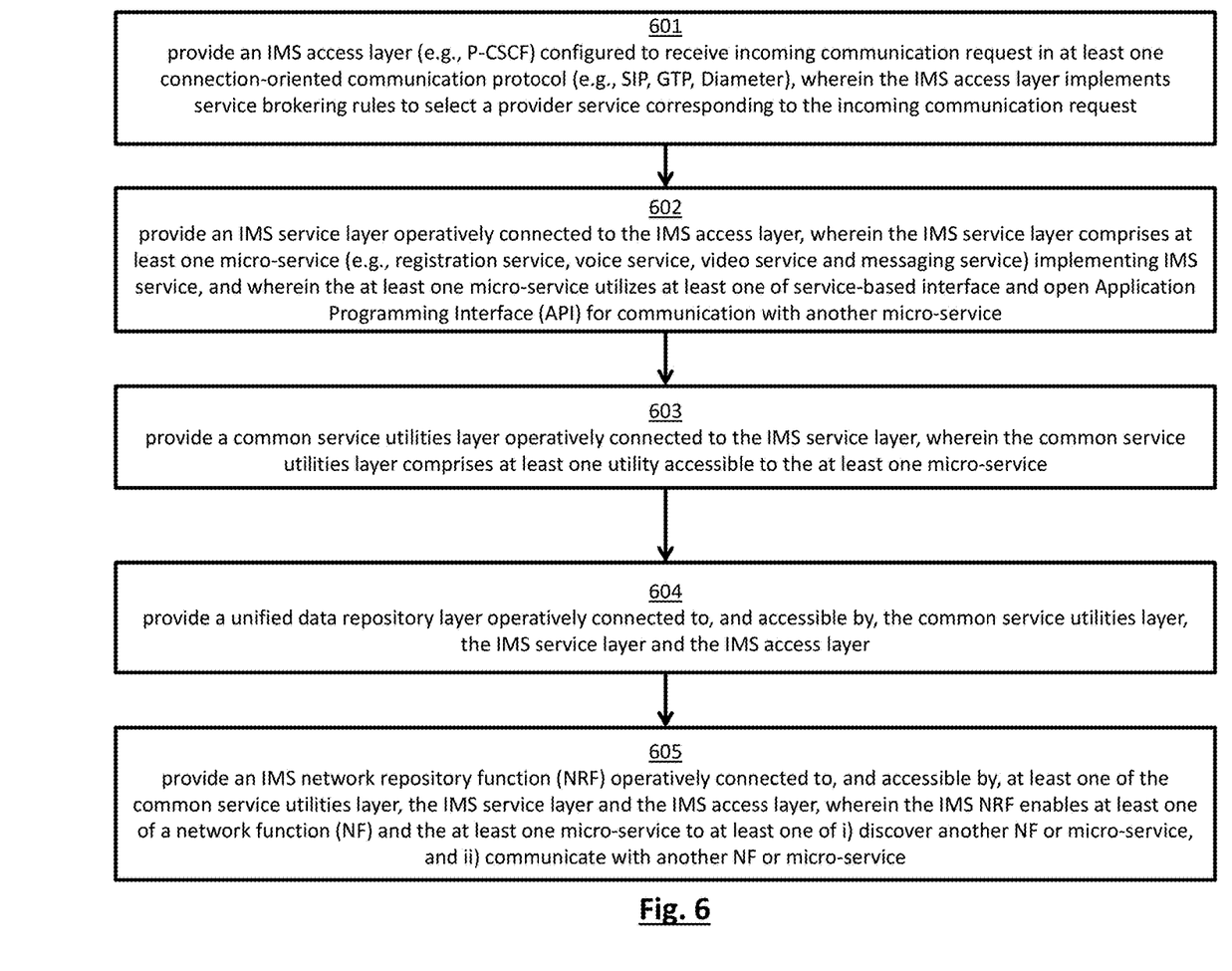
FIG. 6 is a flowchart illustrating a method of providing communication within IP Multimedia Subsystem (IMS) using a connectionless communication protocol.

FIG. 6 is a flowchart illustrating a method of providing communication within IP Multimedia Subsystem (IMS) using a connectionless communication protocol. At block 601, an IMS access layer (e.g., P-CSCF) configured to receive incoming communication request in at least one connection-oriented communication protocol (e.g., SIP, GTP, Diameter) is provided, wherein the IMS access layer implements service brokering rules to select a provider service corresponding to the incoming communication request. At block 602, an IMS service layer operatively connected to the IMS access layer is provided, wherein the IMS service layer comprises at least one micro-service (e.g., registration service, voice service, video service and messaging service) implementing IMS service, and wherein the at least one micro-service utilizes at least one of service-based interface and open Application Programming Interface (API) for communication with another micro-service. At block 603, a common service utilities layer operatively connected to the IMS service layer is provided, wherein the common service utilities layer comprises at least one utility accessible to the at least one micro-service. At block 604, a unified data repository layer is provided, which unified data repository layer is operatively connected to, and accessible by, the common service utilities layer, the IMS service layer and the IMS access layer. At block 605, an IMS network repository function (NRF) is provided, which IMS network repository function is operatively connected to, and accessible by, at least one of the common service utilities layer, the IMS service layer and the IMS access layer, wherein the IMS NRF enables at least one of a network function (NF) and the at least one micro-service to at least one of i) discover another NF or micro-service, and ii) communicate with another NF or micro-service.

In this document, the term "computer-readable medium" generally refers to media such as removable storage drive, a hard disk installed in hard disk drive, and the like, which media serve as storage for computer programs that can be provided to, and executed by, computer systems. Computer programs can also be received via a communications interface. Computer programs, when executed, enable the computer system to perform the features of the present invention, as discussed herein. In particular, the computer programs, when executed, enable a processor to perform the features of the example embodiments of the present disclosure.

The example embodiments according to the present disclosure can be implemented primarily in software or, in the alternative, in hardware using, for example, hardware components such as application specific integrated circuits (ASICs). Implementation of the hardware state machine so as to perform the functions described herein will be apparent to persons skilled in the relevant art(s). Alternatively, the example embodiments according to the present disclosure can be implemented using a combination of both hardware and software.

While various example embodiments of the present disclosure have been described above, the example embodiments are merely exemplary and should not be interpreted as limiting. It will be apparent to persons skilled in the relevant art(s) that various changes in form and detail can be made therein, and these variations are fully encompassed by the present disclosure.

The invention claimed is:

1. A method of providing communication within IP Multimedia Subsystem (IMS) using a connectionless communication protocol, comprising:
    providing an IMS access layer configured to receive incoming communication request in at least one connection-oriented communication protocol;
    providing an IMS service layer operatively connected to the IMS access layer, wherein the IMS service layer comprises at least one micro-service implementing IMS service, and wherein the at least one micro-service utilizes at least one of service-based interface and open Application Programming Interface (API) for communication with another micro-service;
    providing a common service utilities layer operatively connected to the IMS service layer, wherein the common service utilities layer comprises at least one utility accessible to the at least one micro-service;
    providing a unified data repository layer operatively connected to, and accessible by, the common service utilities layer, the IMS service layer and the IMS access layer; and
    providing an IMS network repository function (NRF) operatively connected to, and accessible by, at least one of the common service utilities layer, the IMS service layer and the IMS access layer, wherein the IMS NRF enables at least one of a network function (NF) and the at least one micro-service to at least one of i) discover another NF or micro-service, and ii) communicate with another NF or micro-service.

2. The method of claim 1, wherein the at least one connection-oriented communication protocol comprises at least one of Session Initiation Protocol (SIP), General Packet Radio Service Tunnel Protocol (GTP) and Diameter.

3. The method of claim 1, wherein the at least one micro-service comprises at least one of registration service, voice service, video service and messaging service.

4. The method of claim 1, wherein the at least one utility comprises at least one of charging function and subscriber data management function.

5. The method of claim 1, wherein the unified data repository layer comprises a repository for at least one of active user equipment (UE) context data, dynamic session context data, application-specific data, subscription data, policy data, and network data.

6. The method of claim 1, wherein the IMS access layer implements service brokering rules to select a provider service corresponding to the incoming communication request.

7. The method of claim 6, wherein the IMS access layer comprises a Proxy Call Session Control Function (P-CSCF) configured to apply the service brokering rules.

8. The method of claim 7, wherein the P-CSCF transforms a Session Initiation Protocol (SIP) register request received from an IMS SIP client to a register request Representational State Transfer Application Programming Interface (REST API) and routes the register request REST API to the selected provider service.

9. The method of claim 7, wherein the P-CSCF transforms a Session Initiation Protocol (SIP) invite request received from an IMS SIP client to an audio-visual (AV) session setup request Representational State Transfer Application Programming Interface (REST API) and routes the AV session setup request REST API to the selected provider service.

10. The method of claim 7, wherein the P-CSCF transforms a Session Initiation Protocol (SIP) invite request received from an IMS SIP client for a Rich Communication Service (RCS) chat session to an RCS chat session setup request Representational State Transfer Application Programming Interface (REST API) and routes the RCS chat session setup request REST API to the selected provider service.

11. A system comprising:
electronic circuitry and non-transitory computer-readable medium storing instructions executable for providing communication within IP Multimedia Subsystem (IMS) using a connectionless communication protocol, and comprising:
an IMS access layer configured to receive incoming communication request in at least one connection-oriented communication protocol;
an IMS service layer operatively connected to the IMS access layer, wherein the IMS service layer comprises at least one micro-service implementing IMS service, and wherein the at least one micro-service utilizes at least one of service-based interface and open Application Programming Interface (API) for communication with another micro-service;
a common service utilities layer operatively connected to the IMS service layer, wherein the common service utilities layer comprises at least one utility accessible to the at least one micro-service;
unified data repository layer operatively connected to, and accessible by, the common service utilities layer, the IMS service layer and the IMS access layer; and
an IMS network repository function (NRF) operatively connected to, and accessible by, the common service utilities layer, the IMS service layer and the IMS access layer, wherein the IMS NRF enables at least one of a network function (NF) and the at least one micro-service to at least one of i) discover another NF or micro-service, and ii) communicate with another NF or micro-service.

12. The system of claim 11, wherein the at least one connection-oriented communication protocol comprises at least one of Session Initiation Protocol (SIP), General Packet Radio Service Tunnel Protocol (GTP) and Diameter.

13. The system of claim 11, wherein the at least one micro-service comprises at least one of registration service, voice service, video service and messaging service.

14. The system of claim 11, wherein the at least one utility comprises at least one of charging function and subscriber data management function.

15. The system of claim 11, wherein the unified data repository layer comprises a repository for at least one of active user equipment (UE) context data, dynamic session context data, application-specific data, subscription data, policy data, and network data.

16. The system of claim 11, wherein the IMS access layer implements service brokering rules to select a provider service corresponding to the incoming communication request.

17. The system of claim 16, wherein the IMS access layer comprises a Proxy Call Session Control Function (P-CSCF) configured to apply the service brokering rules.

18. The system of claim 17, wherein the P-CSCF transforms a Session Initiation Protocol (SIP) register request received from an IMS SIP client to a register request Representational State Transfer Application Programming Interface (REST API) and routes the register request REST API to the selected provider service.

19. The system of claim 17, wherein the P-CSCF transforms a Session Initiation Protocol (SIP) invite request received from an IMS SIP client to an audio-visual (AV) session setup request Representational State Transfer Application Programming Interface (REST API) and routes the AV session setup request REST API to the selected provider service.

20. The system of claim 17, wherein the P-CSCF transforms a Session Initiation Protocol (SIP) invite request received from an IMS SIP client for a Rich Communication Service (RCS) chat session to an RCS chat session setup request Representational State Transfer Application Programming Interface (REST API) and routes the RCS chat session setup request REST API to the selected provider service.

* * * * *